United States Patent [19]

Davis

[11] 4,227,487
[45] Oct. 14, 1980

[54] ANIMAL EXERCISING APPARATUS

[75] Inventor: Grover M. Davis, Audubon, Iowa

[73] Assignee: Emmert Manufacturing Co., Inc., Audubon, Iowa

[21] Appl. No.: 52,348

[22] Filed: Jun. 27, 1979

[51] Int. Cl.³ ............................................. A01K 15/02
[52] U.S. Cl. ...................................... 119/29; 272/69
[58] Field of Search ........................... 119/29; 272/69; 361/212, 214; 198/841

[56] References Cited

U.S. PATENT DOCUMENTS

| 2,375,304 | 5/1945 | Kilduff | 361/212 |
| 2,569,116 | 9/1951 | Roscoe et al. | 361/214 |
| 2,969,768 | 1/1961 | Grant | 119/29 |
| 3,703,284 | 11/1972 | Hesen | 272/69 |
| 3,709,197 | 1/1973 | Moseley | 119/29 |
| 3,870,297 | 3/1975 | Elder | 272/69 |
| 3,952,704 | 4/1976 | Webb | 119/29 |
| 4,095,561 | 6/1978 | Ruetomik | 119/29 |
| 4,148,477 | 4/1979 | Larson | 272/69 |

Primary Examiner—Hugh R. Chamblee
Attorney, Agent, or Firm—Henderson & Sturm

[57] ABSTRACT

An exercising apparatus for horses having a frame with a first roller rotatably attached to one end of the frame and a second roller rotatably attached to the other end of the frame. Support structure is attached to the frame between the first and second roller for supporting an endless belt, the support means including a substantially flat piece of ultra high molecular weight polyethelyne plastic material. An endless belt is disposed over the plastic material and is in direct contact therewith and around the first and second roller. A power assembly is provided for rotating the first roller, thereby causing the endless belt to move around the first and second rollers and over the piece of plastic material. Longitudinal grooves are disposed in the piece of plastic material and metal rods are disposed in the grooves and are operatively attached to said frame for grounding static electricity caused by movement of the endless belt over the piece of plastic material to the frame.

19 Claims, 7 Drawing Figures

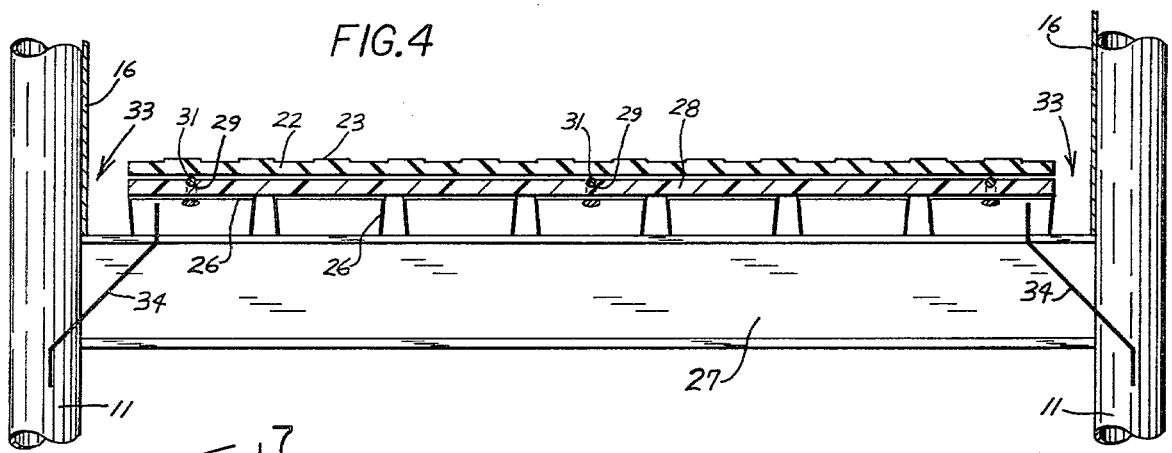
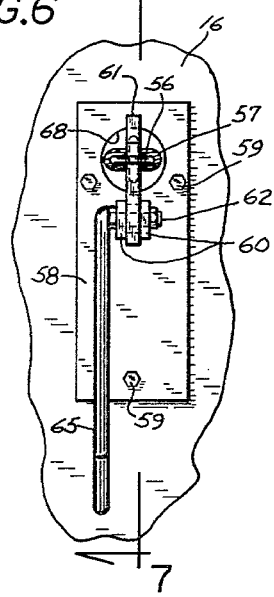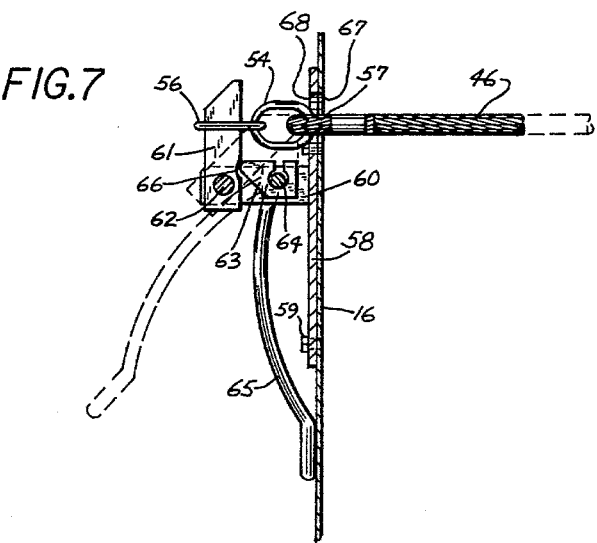
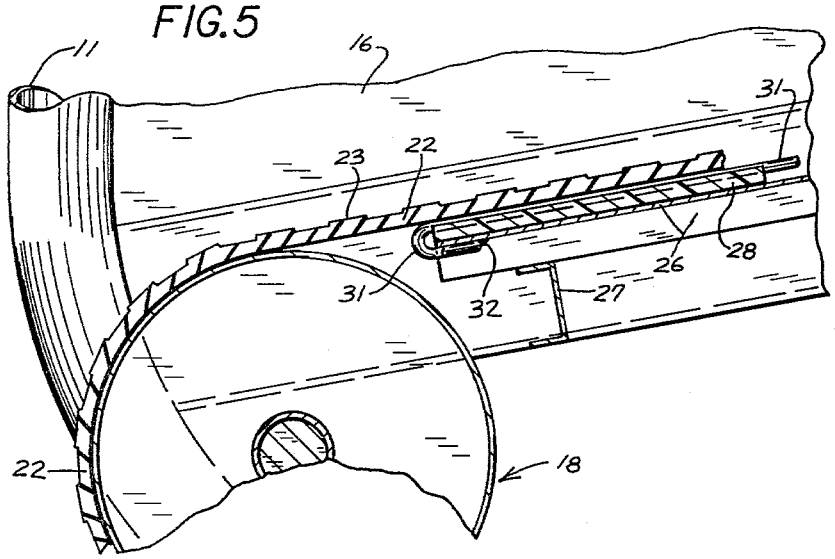

ANIMAL EXERCISING APPARATUS

BACKGROUND OF THE INVENTION

The present invention relates generally to an apparatus for exercising animals and more particularly to a treadmill device for exercising horses.

There have been many attempts to provide a suitable exercising device for horses of a general type having a treadmill upon which a horse walks or runs. Examples of such devices are shown in U.S. Pat. Nos. 3,709,197, 3,952,704 and 4,095,561. U.S. Pat. Nos. 3,709,191 and 4,095,561 are typical of the prior art in that they show a plurality of rollers underneath an endless conveyor belt for supporting the weight of the horse thereon. It has been determined that there are very serious problems with such a roller supporting structure. Such roller support structure does not provide a good solid support and additionally there is a problem with hock, ankle and bone damage due to excessive roller vibration. There is also a hazard in the event of a belt separation that the horse cannot or will not stand directly on the rollers. This hazard cannot be minimized with a roller arrangement because the horse is likely to panic and hurt itself. Furthermore, there can be excessive downtime if these rollers or the bearings therefor need replacement.

One solution to this roller problem is suggested in U.S. Pat. No. 3,994,261, wherein it is suggested that a sheet of polished stainless steel be used as a supporting surface. One of the main problems with this, besides the high cost, is that an intolerable amount of friction is produced between the belt and the stainless steel supporting surface. In the conveyor art in general, ultra high molecular weight polyethelyne plastic material has been used for a supporting surface in place of rollers. Heretofore, however, such material has not been feasible for use in horse treadmills because the rubbing together of belt over such a non-conductive material produces very high concentrations of static electricity; and, when this static electricity is transmitted to a horse and the horse touches a portion of the metallic frame, the horse is shocked in much the same way that a person can be shocked by walking on a carpet in the winter time and then touching something metallic.

Consequently, there is a need for a treadmill for horses, or the like, which has adequate supporting surface as distinguished from the roller structure; a supporting structure which has a low coefficient of friction as contrasted with the stainless steel support structure mentioned above; and, one which does not have the static electricity problem mentioned above when ultra high molecular weight polyethelyne plastic material is used as a supporting structure.

Another problem associated with horse treadmill devices is that of getting the horse onto the treadmill with one person and getting the device into operation. Heretofore this has been at least a two person operation and there is consequently a need for such a device which can be utilized by one person alone.

A further problem with the prior art devices of this general type is the one of safety. The prior art tends to have devices which do not have curves on every corner as are necessary. Furthermore, certain restraining devices for the horse can sometimes be partially circumvented by the horse and then there is a danger that the horse will injure itself trying to extricate itself from such contraptions. Consequently, there is a need for devices which will minimize these dangers.

A further problem with prior art devices using a restraining member for holding the horse in place is that the horse will often times exert a tremendous amount of force on such device, especially if it has, for example, put one foot over such restraining device. It then becomes almost impossible for the operator of the device to unlatch it because of the pressure thereon. Consequently, there is a need for releasing structure which can be released easily without danger to the operator of the device or to the horse. In the past, for example, people have found it necessary to use knives, or the like, to cut a restraining rope in such emergency situation, and when this becomes necessary, there is always the danger that the knife will cut the horse or the person using it because the horse is so excited and anxious to get out of such predicament. These situations can also be quite tramatic for a horse and can cause such horse to refuse to enter a treadmill again. Consequently, there is a need to minimize any possibilities that the horse will experience such tramatic events.

SUMMARY OF THE INVENTION

The present invention relates to an exercising apparatus for horses having a frame with a first roller rotatably attached to one end of the frame and a second roller rotatably attached to the other end of the frame. Support structure is attached to the frame between the first and second roller for supporting an endless belt, the support means including a substantially flat piece of ultra high molecular weight polyethelyne plastic material. An endless belt is disposed over the plastic material and is in direct contact therewith and around the first and second roller. A power assembly is provided for rotating the first roller, thereby causing the endless belt to move around the first and second rollers and over the piece of plastic material. Longitudinal grooves are disposed in the piece of plastic material and metal rods are disposed in the grooves and are operatively attached to said frame for grounding static electricity caused by movement of the endless belt over the piece of plastic material to the frame.

An object of the present invention is to provide an improved animal exercising apparatus.

Another object of the invention is to provide a treadmill for horses providing adequate support under the belt thereof.

A further object of the invention is to provide a low friction solid support structure which avoids a buildup of static electricty.

Still another object of the present invention is to provide a treadmill structure which is as safe for the horse and for the human operator thereof as is possible.

A still further object of the present invention is to provide a treadmill which is self-cleaning.

Still a further object of the invention is to provide a horse treadmill which is extremely dependable to use while also being economical to produce.

Other objects, advantages, and novel features of the invention will become apparent from the following detailed description of the invention when considered in conjunction with the accompanying drawings.

BRIEF DESCRIPTION OF THE DRAWINGS

FIG. 4 is a cross-sectional view taken along 4—4 of FIG. 3;

FIG. 5 is an enlarged cross-sectional view similar to that shown in FIG. 3;

FIG. 6 is a detailed view of the connecting mechanism for the restraining ropes which go across the front and rear of the apparatus; and FIG. 7 is a cross-sectional view taken along line 7—7 of FIG. 6.

DESCRIPTION OF THE PREFERRED EMBODIMENT

Figure 1:
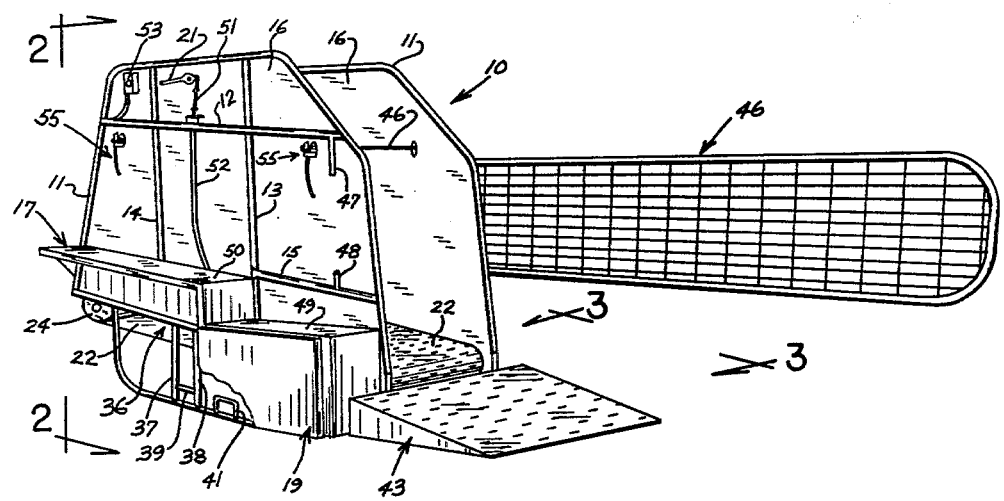
FIG. 1 is a perspective view of a preferred embodiment of the exercising apparatus of the present invention.

Referring now to the drawings, wherein like reference drawing numerals designate identical or corresponding parts throughout the several views, FIG. 1 shows an animal exercising apparatus 10 constructed in accordance with the present invention. A tubular frame 11 is shown in FIG. 1 going around each side of the apparatus 10 and a plurality of inner tubular braces 12, 13, 14 and 15 are also provided for providing stability to each of the walls 16. These walls 16 are preferrably formed of sheet metal such as steel. The opposite side of the apparatus 10 is substantially identical to the side shown in FIG. 1 except that the opposite side does not have the controls referred to below adjacent to the walkway structure 17.

Figure 3:
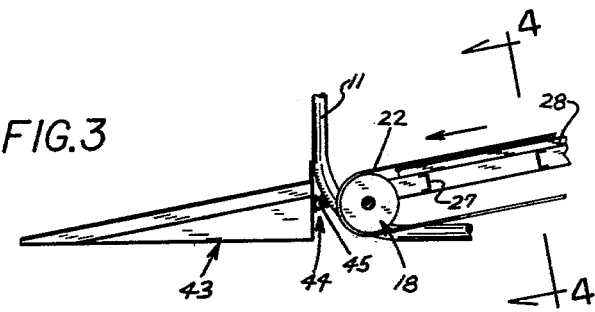
FIG. 3 is a partial view taken along line 3—3 of FIG. 1.

Referring now with more particularity to FIGS. 1, 3, 4 and 5, it is noted that a first rear roller 18 is rotatably mounted to the frame 11 as can be seen clearly in FIGS. 3 and 5. This roller 18 is driven by a hydraulic motor and gear box assembly (not shown) that is housed within the housing 19. A cable control lever 21, shown in FIG. 1, is provided for controlling the speed of the hydraulic motor and gear box assembly and thereby the control speed of the roller 18 and consequently the speed of the endless belt 22. This endless belt 22 is formed of a resilient flexible rubber-like material and has projections 23 thereon for preventing slippage of an animal using the apparatus 10. A second or front portion thereof and the endless belt 22 extends around such front roller 24 and around the rear roller 18. A plurality of longitudinally extending sheet metal beams 26 are welded to a frame member 27 which is, in turn, welded to the tubular frame members 11 as can be seen clearly in FIGS. 4 and 5. A sheet of ultra high molecular weight polyethelyne plastic 28 rests upon the slats 26 and plurality of grooves 29 are disposed longitudinally along the entire length of such piece 28. Metal rods 31 are disposed in the grooves 29 and are crimped around each end thereof as can best be seen in FIG. 5, so that the ends of the rods 31 are in good electrical contact with the member 26. A weld 32 can be utilized to insure good electrical contact.

Referring again to FIG. 4 it is noted that a space 33 is disposed on each side of the endless belt 22 between the endless belt 22 and the walls 16 whereby dirt and manure can pass downwardly therethrough and prevent an accumulation of such on top of the belt 22. Immediately below the space 33 along the entire length of the space 33 is a long deflecting member 34 having the configuration shown in FIG. 4. This shield 34 is welded to the frame members 11 and to slats 26. The purpose of such shield 34 is to cause dirt and manure passing down through the opening 33 to be deflected outwardly and onto the ground instead of falling down and dropping onto the inside of the belt 22, for example at the point 36 shown in FIG. 1.

Referring to FIG. 1, it is noted that braces 37 and 38 and members 39 and 41 attached to frame 11 are provided on each side of the frame 11 for allowing insertion of the forks of a forklift truck for facilitating the moving of the apparatus 10 from place to place.

Figure 2:
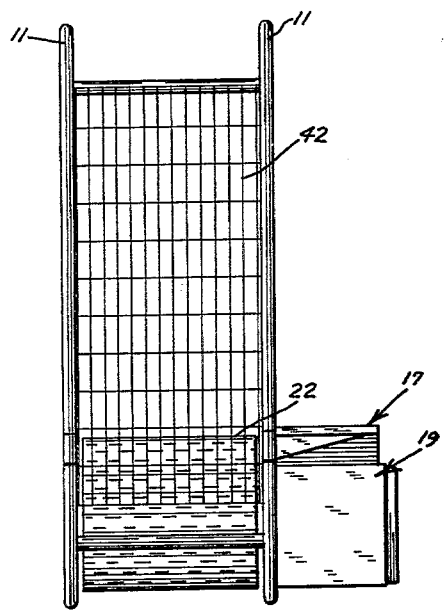
FIG. 2 is a front view taken along line 2—2 of FIG. 1.

In FIG. 2 a forwardmost heavy duty screen member 42 is provided, and this screen 42 is welded to the frontmost portions of the frame member 11 for preventing an animal from going out the front of the exercising treadmill apparatus 10. This structure 42 is made of very heavy duty rods, but there are air spaces in between the rods for allowing the movement of air therethrough, which is important for cooling the horse utilizing the treadmill 10. The fact that the horse can see through the screen 42 also aids in loading the horse into the apparatus 10.

Referring to FIGS. 1 and 3, it is noted that a ramp strucuture 43 is pivotally attached to the frame 11 by means of connecting structure 44. A pin 44 passes through the hinge structure 44 so that the ramp 43 can be removed when the apparatus 10 is moved from place to place.

Referring now to the operation of the device 10, a person wishing to utilize the present invention would first unfasten the rearmost restraining structure 46, but leaving the frontmost restraining structure 46 extending across between the walls 16. A horse could then be lead by the halter up and onto the ramp 43 and with use of the crowding gate 46, if necessary. It is useful, for example, to place the exercising apparatus wall 16 adjacent to a wall or fence and then have the crowding gate 46 on the other side thereof such that a person can readily utilize the crowding gate 46. It is also to be understood that the crowding gate 46 can be readily moved from one side of the device to the other as is needed, for example, by attaching crowding gate pivoting structure to the member 47 and 48 in a well-known manner. Consequently, once the horse and the person leading the horse has stepped onto the ramp 43, that person can then step up onto the surface 49 and then onto the surface 50 of the walkway 17 while still leading the horse. Once the operator is standing near the front of the platform walkway 17 and the horse is on the endless belt 22 and normally bumping up against the frontmost flexible restraining member 46, then, at this point in time, the handle 21 can be utilized to start the endless belt 22 moving. As this is done, the horse will begin to walk or run at whatever gate is appropriate for that horse, depending on the speed of the belt 22. One important aspect of the control member 21 is that it is of a well-known type which has a friction brake setting thereon, so that it will stay in whatever position it is set without holding onto it. A cable 51 is attached to one end of the handle 21 and extends down through a conduit 52 to control the motor and gear box assembly (not shown) within the housing 19. Once the horse is exercising and, the handle 21 is set in the proper position, then a timer 53 can (optionally) be set to shut off the motor within the housing 19 after a predetermined amount of time. Once the timer is set to a desired time, then the flexible restraining member 46 can be strung again across from the far wall 16 to the near wall 16 (as viewed in FIG. 1) to thereby prevent the horse from backing out. Generally, after this is done, the horse can be left unattended until the timer 53 shuts off the motor and the treadmill stops.

Referring now to the operation of the connecting structure shown in FIGS. 6 and 7 for the restraining member 46, it is noted that a plurality of link or loop members 54 and 56 are connected to the end of a loop 57 on one end of the rope or cable 46. A plate structure 58 is attached to the wall 16 by fastener bolts 59. Cantilever members 60 are rigidly connected to the plate 58, such as by welding. A latch member 61 is pivotally attached between the cantilever members 60 by means of a nut and bolt fastening device 62. A cam member 63 is rigidly attached to a rod 64 which is, in turn, rigidly attached to a handle 65. The rod 64 is pivotally disposed within openings in the cantilever members 60. One end of the cam structure 63 extends into a cut-out partially circular portion 66 in the latch member 61 for facilitating easy operation of the cam 63.

When it is desired to use the restraining apparatus 46, then the loop 56 is threaded through an opening 67 in the wall 16 and through an opening 68 in the plate 58. The handle 65 is moved from the position shown by the solid lines in FIG. 7 to the position shown in dashed lines in FIG. 7 whereby the cam will be moved out of the way and the member 61 will pivot, by gravity, over to the position shown in dashed lines in FIG. 7. At that time, the loop 46 can be moved over the latch member 61. Then, the handle 65 is moved from the position shown in dashed lines in FIG. 7 to the position shown in solid lines in FIG. 7; and, accordingly, the cam 63 and the latch member 61 will be moved to the position shown in solid lines in FIG. 7. Consequently, the restraining device 46 is securely held in place in the position shown in FIG. 1, extending across between the walls 16.

When it is desired to release the horse from the treadmill apparatus 10, quite offen the horse is backing up and causing the flexible member 46 to be very tight. With prior art devices it has been impossible, or extremely difficult, to release such flexible restraining apparatus 46 when there is this extreme pressure thereon. This problem has been overcome by use of the structure shown in FIGS. 6 and 7 because the cam 63 can be easily moved by the handle 63 moving out of the circular depression 66 in the latch member 61, thereby allowing the latch member 61 to move to the position shown in dashed lines in FIG. 7, and thereby allowing the loop 56 to move off of the end of latch member 61 and consequently allowing the flexible restraining member 46 to be released. This allows the loop 56 to pass outwardly through the openings 67 and 68. The horse can then be backed out of the treadmill apparatus 10.

Occasionally it becomes a problem that the horse, while using the treadmill, will become excited and put one or both feet over the front restraining member 46. If this occurs, then the forwardmost latch structure 55 can likewise be released without danger to the operation or to the horse. This front restraining member prevents the horse from moving so far forward on the belt 22 that it would hit its front legs on the screen 42 while exercising.

As mentioned above, one of the problems that is overcome by this invention is that proper support and low friction is provided by use of the ultra high molecular weight polyethelyne plastic material 28. The use of this member 28 solves the problem of providing adequate support for the horse which the rollers of the prior art do not provide, and also solves the friction problem. But a great deal of static electricity is generated between the members 22 and 28. Consequently the provision of the rods 31 as shown in detail in FIGS. 4 and 5 are provided for gounding this static electricity, first through the rods 31 and then to the metal slats 26 which are connected to the metal frame member 27 hich are, in turn, grounded to the frame 11, which is setting on the gound. If such static electricity is allowed to build up, then the horse would be a conduit for grounding such static electricity to the frame 16 and therefore to the frame 11. This would create a spark between the horse and the wall member 16 which is not permissible. It has been determined by experience that a horse subjected to such a shock will be extremely reluctant to enter the apparatus 10 again and in certain cases it is almost impossible to load on such apparatus 10.

Obviously many modifications and variations of the present invention are possible in light of the above teachings. It is therefore to be understood that, within the scope of the appended claims the invention may be practiced otherwise then as specifically described.

I claim:

1. An exercising apparatus for horses comprising:
a frame;
a first roller means rotatably attached to one end of said frame;
a second roller means rotatably attached to the other end of said frame;
support means attached to said frame between said first and second roller means for supporting an endless belt, said support means including a substantially flat piece of ultra high molecular weight polyethelyne plastic material;
an endless belt disposed over said plastic material and in direct contact therewith and around said first and second roller means;
power means for rotating said first roller means and thereby causing said endless belt to move around said first and second roller means and over said piece of plastic material;
a groove disposed in said piece of plastic material; and
grounding means disposed in said groove and operatively attached to said frame for grounding static electricity caused by movement of said endless belt over said piece of plastic material to said frame.

2. The apparatus of claim 1 wherein said groove is disposed along the entire length of said piece of plastic and said grounding means includes a rod extending in said groove and in contact with said endless belt, said rod extending over and around each end of said piece of plastic material and in contact at at least one end thereof with an electrically conductive member which is operatively electrically connected to said frame.

3. The apparatus as defined in claim 2 wherein a plurality of grooves like said groove are disposed in said piece of plastic and a plurality of rods extend in and along respective ones of said grooves, each rod being electrically connected to said frame.

4. The apparatus of claim 1 wherein said endless belt is comprised of a non-electrically conductive resilient flexible material.

5. The apparatus of claim 1 wherein a pair of upstanding wall means are attached to said frame and are disposed on each side of said endless belt and spaced from said endless belt for preventing a horse from falling off of said endless belt to one side or the other.

6. The apparatus of claim 5 wherein a screen shaped structure is attached to a front portion of said wall means for preventing a horse from going out the front end of said wall means, said screen structure having openings therein for allowing wind to pass therethrough for cooling the horse.

7. The apparatus of claim 5 including dirt deflector means attached to said frame below the space between the wall means and the endless belt, under a top portion of the endless belt and above a bottom portion of the endless belt; an inner portion of said deflector means being above an outer portion thereof so that dirt or manure passing between the endless belt and the wall means will be prevented from dropping onto the inside of the endless belt and instead will be guided to locations on the ground outside of the wall means.

8. The apparatus as defined in claim 5 including crowding gate means pivotally attached to one of the wall means and including means for allowing said gate means to be removed from said one wall means and pivotally attached to the other wall means.

9. The apparatus as defined in claim 5 including means attached to the frame for receiving fork lift tines for allowing said apparatus to be moved from place to place by a fork lift truck.

10. The apparatus of claim 7 wherein a ramp means is selectively pivotally attached to the rear of said frame for providing easy access for a horse to walk onto said endless belt, a crack being provided between said ramp means and said endless belt, said crack being much narrower in width than the hoof of a horse but wide enough for allowing substantial amounts of dirt and manure to pass therethrough to the ground.

11. The apparatus of claim 10 wherein said belt means is driven in a direction such that the rearmost top portion thereof at any one time passes downwardly through said crack, thereby conveying dirt and manure on said belt down through said crack for keeping the top portion of the endless belt clean.

12. The apparatus of claim 11 including flexible restraining means for preventing a horse from backing out from between said wall means, said restraining means being attached to an upper rearward portion of each of said wall means and extending across and above the endless belt; and, connecting means attached to one of said wall means for selectively connecting or disconnecting one end of said flexible restraining means.

13. The apparatus of claim 12 wherein said connecting means comprises a loop on one end of said flexible restraining means; a cantilever member rigidly attached to said one of the wall means; a latch member pivotally attached to the cantilever member and pivotable from a first substantially vertical position disposed in said loop to a position pivoted towards said one wall means for releasing the loop; a handle pivotally attached to said cantilever member and a cam means rigidly attached to said handle, said cam means being disposed between said one wall means and said latch member and having a first position for holding the latch member in said vertical position and a second position for allowing said latch to pivot to the second position thereof for releasing said loop and thereby said flexible restraining means.

14. The apparatus of claim 13 including a second flexible restraining means substantially identical to the first said one disposed between said wall means at an upper front portion of said wall means and including a second connecting means substantially identical to the first said one for selectively releasably restraining a horse from moving too far forwardly on said endless belt.

15. The apparatus of claim 14 wherein said first roller means is disposed at a level below the second roller means and said piece of plastic material is disposed at an angle with respect to the ground generally between the top portions of said first and second roller means whereby a horse exercising on said endless belt simulates running uphill.

16. The apparatus of claim 13 wherein a partially circular notch means is disposed in said latch member for reception of said cam means for facilitating easy movement of said cam means out of and into engagement with said latch member.

17. The apparatus of claim 16 wherein said handle is pointing downwardly when said latch member is in the vertical latched position.

18. The apparatus of claim 14 including walkway means attached to one of said wall means for allowing a person leading a horse to walk a horse onto said endless belt and have access to said first and second restraining means and to said first and second connecting means from said walkway means.

19. The apparatus of claim 18 including a speed control means having a friction handle means for maintaining whatever speed is set by the handle without continuously holding the handle in position; said friction handle means being attached to said wall means above said handle means and within easy reach of a person on said walkway holding the halter of a horse in a proper exercising position on said endless belt.

* * * * *